US012417413B2

(12) United States Patent
Platten et al.

(10) Patent No.: US 12,417,413 B2
(45) Date of Patent: Sep. 16, 2025

(54) CONTENT MODERATION

(71) Applicant: GOBUBBLE AI TECH LIMITED, Dubai (AE)

(72) Inventors: Neil Henry Platten, Chester (GB); Marzia Catherine Azam, Chester (GB); Danielle Sarah Lucinda Platten, Chester (GB)

(73) Assignee: GOBUBBLE AI TECH LIMITED, Dubai (AE)

( * ) Notice: Subject to any disclaimer, the term of this patent is extended or adjusted under 35 U.S.C. 154(b) by 0 days.

(21) Appl. No.: 18/339,059

(22) Filed: Jun. 21, 2023

(65) Prior Publication Data
US 2023/0401492 A1   Dec. 14, 2023

Related U.S. Application Data

(63) Continuation of application No. PCT/EP2022/078593, filed on Oct. 13, 2022.

(51) Int. Cl.
*G06N 20/20*   (2019.01)
*G06F 40/279*   (2020.01)
*G06F 40/30*   (2020.01)
*G06V 20/40*   (2022.01)

(52) U.S. Cl.
CPC .......... *G06N 20/20* (2019.01); *G06F 40/279* (2020.01); *G06F 40/30* (2020.01); *G06V 20/41* (2022.01)

(58) Field of Classification Search
CPC ....... G06N 20/20; G06F 40/279; G06F 40/30; G06F 16/9535; G06V 20/41
See application file for complete search history.

(56) References Cited

U.S. PATENT DOCUMENTS

| 10,592,578 | B1 * | 3/2020 | Mokashi ............... H04N 21/25 |
| 10,962,939 | B1 * | 3/2021 | Das ..................... G06F 16/3344 |
| 11,282,509 | B1 * | 3/2022 | Li ........................... G06F 16/65 |
| 11,423,265 | B1 * | 8/2022 | Chen ..................... G06T 11/00 |
| 2006/0280303 | A1 * | 12/2006 | Gupte ................. H04N 21/835 380/239 |
| 2014/0101119 | A1 * | 4/2014 | Li ....................... G06F 16/3331 707/706 |
| 2017/0372232 | A1 * | 12/2017 | Maughan .............. G06F 3/0482 |
| 2018/0063192 | A1 * | 3/2018 | Mcguire ............. G06F 16/9535 |
| 2018/0107479 | A1 * | 4/2018 | Duppenthaler .......... G06F 8/71 |

(Continued)

OTHER PUBLICATIONS

Bhatti et al., "Explicit Content Detection System: An Approach towards a Safe and Ethical Environment," Applied Computational Intelligence and Soft Computing vol. 2018, Article ID 1463546, 13 pages (Year: 2018).*

(Continued)

*Primary Examiner* — Miranda M Huang
*Assistant Examiner* — Yao David Huang
(74) *Attorney, Agent, or Firm* — Seed Intellectual Property Law Group LLP

(57) ABSTRACT

A computer system includes a machine learning content moderation component. The machine learning moderation component receives input data representative of a media post or message made on an online platform; analyses the input data using a plurality of machine learning models; and combines outputs of the plurality of machine learning models to generate a moderation result indicating whether the media post or message contains offensive content.

10 Claims, 7 Drawing Sheets

(56) References Cited

U.S. PATENT DOCUMENTS

| | | | |
|---|---|---|---|
| 2020/0134095 A1* | 4/2020 | Weldemariam | G06F 16/35 |
| 2020/0193285 A1* | 6/2020 | Ishii | G06N 20/00 |
| 2021/0058352 A1* | 2/2021 | Fogu | G06F 40/279 |
| 2021/0157872 A1 | 5/2021 | David | |
| 2022/0174358 A1* | 6/2022 | Zavesky | G06V 20/46 |
| 2022/0284884 A1* | 9/2022 | Tongya | A63F 13/67 |

OTHER PUBLICATIONS

Dooms et al., "Offline optimization for user-specific hybrid recommender systems," Multimed Tools Appl (2015) 74:3053-3076 (Year: 2015).*

Nakov et al., "Detecting Abusive Language on Online Platforms: A Critical Analysis", arxiv.org, Feb. 27, 2021, XP081893365, pp. 1-5.

"Notification of Transmittal of the International Search Report and the Written Opinion of the International Searching Authority, or the Declaration", International Application No. PCT/EP2022/078593 filed Oct. 13, 2022, mailed Feb. 21, 2023, 15 pages.

* cited by examiner

CONTENT MODERATION

CROSS-REFERENCE TO RELATED APPLICATIONS

This Application is a Continuation of PCT/EP2022/078593 filed Oct. 13, 2022 and claims priority to GB Application No. 2208656.5 filed Jun. 13, 2022 and entitled "CONTENT MODERATION," each of which is hereby incorporated by reference in its entirety.

In cases where the present application conflicts with a document incorporated by reference, the present application controls.

BACKGROUND

Billions of people have social media accounts, and millions of posts are made on social media each day. As any user of social media would appreciate, a significant portion of social media posts contain inappropriate or offensive content, including hate speech such as racist, misogynistic or homophobic content. Additionally, toxicity, online harassment, misinformation and bullying are commonplace. Similar issues arise in other online contexts beyond large social media platforms, including platforms for online dating, sports, esports or other online gaming and the like.

The enormous volumes of content on such media means they cannot be moderated manually, and so there is a need for automated solutions for content moderation.

SUMMARY

The present applicants have provided a computer system for detecting and moderating content for creating safer, healthier and kinder online communities. Contextual analyses of content can prevent issues arising in real time using an AI content moderation and detection tool plugged into an enterprise platform. The tool can check text, emoji, photo, video and audio in order to detect and moderate content in any of those media.

The AI tool may use machine learning (ML) to analyse how the community interacts with the users computer devices in that community.

The content detection and moderation tools may be used in social media channels to free them from toxicity and hate content. The AI tools shield users from abusive content, improving their digital experience and supporting positive mental wellbeing.

The AI tool can be run on childrens' social accounts, to locate harmful messages and prevent a child from seeing them. A parent or other guardian can be provided with a dashboard which displays the issues which have been stopped in the childs' social accounts.

The computer system and AI tool utilized in the system allow social media managers, communities, and brands to choose the level of content moderation which is provided in various social media and internet channels.

AI driven content detection and moderation tools can be utilized in digital communities including schools, sports teams and leagues, and individuals.

The aim is to improve content detection and moderation in a digital environment to reduce digital harm. Consistent with definitions used in the field, content detection is the act of locating harmful digital content in a piece of media content. Content moderation is the act of determining the technical action to take based on the detection of that harmful content. This technical action could include, for example, blocking the content from being displayed, muting the content (in an audio situation) or other ways of preventing the content from reaching a user. In a dashboard, the action taken on particular piece of detected harmful content may be displayed using colour, for example red to indicate mute, block or report actions.

Apart from being harmful to mental health, online hate, toxicity, racism and bullying also serve to disengage users from the digital community. There is increasing regulation requiring certain content moderation to tackle the problem. Growth in harmful digital content has created a need to protect the human component of cyber space both for enterprises and individual users. Enterprises see an increasing amount of inappropriate content, unsafe users and misinformation facilitated across owned platforms and social platforms. Online threats have evolved beyond current vulnerabilities to harmful content for users, causing a rise in online harassment, misinformation, targeted abuse and hate speech.

Social media is ubiquitous, making it more difficult to control what users see. Users exposed to targeted hate have been shown to demonstrate mental health issues.

An aim of the infrastructure is to solve these problems for both online communities and individual users.

Presently, there are some partial solutions which address the problem of a proprietary platform or social media outlet for online communities. These solutions demonstrate high error rates, and triage of non-scalable moderation.

Improved AI moderation can reduce the need for a human moderator in the loop. Furthermore, improved AI moderation can reduce the exposure of human moderators to harmful content. Prior solutions have focused on key word identification which comes with a number of constraints. In particular, the context of which a particular key word is utilized in content may significantly affect the intent behind that content and whether it should be considered harmful or not. There have been some attempts to apply more contextual analyses to key words by certain partial solutions.

The present system utilizes an increased number of axes, for example including key words; escalating/deescalating language; fuzzy logic (to improve detection of hidden harmful contents); and emojis in text.

Further improvements are intended to identify subtle messaging and the sentiment of user generated content. To this end, further axes have been added to be taken into account by AI moderating tools. In particular, an emotion AI tool can detect and moderate harmful content a multimedia message based on sentiment, as well as the other axes of detection/analysis.

Criteria for judging content to be harmful may vary between users/online digital communities. The type of harmful content may also differ in different contexts. To address this, multiple "cubes" can be constructed, each "cube" providing multiple axes of detection and moderation for a particular context. The manner in which the AI tool is deployed in each cube may differ depending on the axes which are used within each cube and the context for each cube. Each particular client can use a number of self-sufficient individual cubes to create their own bespoke content detection and moderation solution.

The core AI tools may learn from each interaction by a user enabling the detection of not just user generating content, but also user generated behaviour. In order to determine user generated behaviour, historical interactions by users are stored for analysis/training of AI models.

A dashboard may be provided in which fully transparent analytics are displayed to enable a human moderator to see which content is being stopped and muted across a digital community. This operates across multiple social media platforms including Twitter, Instagram, Facebook and You-Tube.

Moderation activity may be based on bespoke rules for a particular community.

The AI tool provides higher security because the input of humans is minimized in content moderation. In certain situations, no human moderator may be needed to assess if a piece of detected content is harmful or not, even in differing contexts.

According to a first aspect disclosed herein, there is provided a computer system comprising:
 a machine learning content moderation component, configured to:
  receive input data representative of a media post or message made on an online platform;
  analyse the input data using a plurality of machine learning models; and
  combine outputs of the plurality of machine learning models to generate a moderation result indicating whether the media post contains offensive content.

"Offensive" in this context refers to content that does not meet suitable moderation criteria, which may be predetermined in advance.

The outputs of the various models may correspond to the "axes" of detection/moderation discussed above.

The plurality of machine learning models may comprise one or more of: a sentiment analysis model to output a sentiment value based on the input data, a key word identification model to detect offensive words, an image processing model to detect offensive images, a contextual key word model configured to detect offensive words based on their context; an intention detection model to detect an author of the model's intent; a fuzzy logic model configured to detect offensive words that have been modified to avoid detection; an emoji processing model configured to detect the offensive use of emojis, a toxicity model to detect toxicity.

The machine learning content moderation component may comprise combination logic, the combination logic comprising a predetermined set of operations applied to the outputs to generate the moderation result. The machine learning content moderation component may combine outputs of the plurality of machine learning models by aggregating output scores provided by each machine learning model. The machine learning content moderation component may apply a threshold to the output score provided by each learning model, or to the combined outputs, to determine whether the input data is offensive.

The computer system may comprise a content analysis component, the content analysis component configured to:
 obtain a media post or message from an online platform;
 pre-process the media post or message to generate the input data for the machine learning content moderation component;
 transmit the input data to the content moderation component;
 receive the moderation result from the content moderation component.

The machine learning moderation component may be hosted by a server computer, for example in the cloud. The content analysis component may communicate with the machine learning moderation component via an API (application programming interface). The machine learning moderation component may comprise the API, which may be termed a machine learning moderation component API. The machine learning moderation component may receive the input data and provide the moderation result via the API. The system may comprise a first computer configured to execute the machine learning moderation component and a second computer configured to execute the content analysis component.

The content analysis component may obtain the media post or message using a suitable API. For example, a Twitter API to access Twitter, a Facebook API to access Facebook and so on. That is to say, the or each online platform may comprise a client application API. The media post or message may be a message for display to an account holder having an account on the online platform. This may include a message (e.g. a direct message, DM) sent to the account holder, a message or media post that would be visible on a timeline of the account holder, or a message or media post that is responsive to another media post made by the account holder (e.g. a comment).

The content analysis component may communicate with the online platform, suitably via the API, to delete or hide the media post or message.

The machine learning content moderation component may comprise a plurality of sets of models, wherein each set of models is trained to detect a different type of offensive content. For example, a set of models may be trained to detect one of antisemitism, racism, islamophobia, bullying, misogyny and so on. These may correspond to the above-described cubes.

The plurality of models may comprise platform specific models. The platform specific models may be trained on media post or messages generated on a specific platform. This may allow the system to be readily adapted to different moderation standards. These may also correspond to the above-described cubes.

The media post or message may comprise one or more of text, images, video and audio. The media post or message may be referred to as a content item herein.

The content analysis component may be configured to determine a behaviour profile associated with the account holder. The content analysis component may comprise a storage. The storage may store an association between an account holder and one of a plurality of a behaviour profiles. Each behaviour profile may be representative of a set of content tolerances acceptable to account holders associated with the behaviour profiles.

The machine learning content moderation component may be configured to receive the behaviour profile associated with the account holder, suitably from the content analysis component. The machine learning content moderation component may determine, based on the behaviour profile, a combination logic to apply to the outputs of the plurality of machine learning models to generate the moderation result. The machine learning content moderation component may comprise a storage configured to store a plurality of combination logics and associations between each stored combination logic and a behaviour profile. The machine learning content moderation component may be configured to select one of the stored combination logics based on the behaviour profile and apply the selected combination logic.

The machine learning content moderation component may be configured to moderate a video file comprised in the input data. The machine learning content moderation component may be configured to: retrieve a first frame of the video file; determine whether the first frame passes moderation; in response to determining that the first frame passes moderation, retrieve a second frame and determine whether the second frame passes moderation; in response to determining that the first frame fails moderation, determine that the video file fails moderation.

Determining whether the first or second frame passes moderation may comprise applying one or more of the plurality of machine learning models. Determining whether the first or second frame passes moderation may comprise applying the plurality of machine learning models and combining the outputs thereof to generate a moderation result.

The machine learning content moderation component may be configured to sample the video file to retrieve the first and second frames. The machine learning content moderation component may determine that the video file passes moderation in response to all retrieved frames passing moderation.

The machine learning content moderation component may be configured to analyse the input data using the plurality of machine learning models in parallel.

According to a second aspect of the disclosure, there is provided a computer implemented method of moderation, comprising:
receiving input data representative of a media post or message made on an online platform;
analysing the input data using a plurality of machine learning models; and
combining outputs of the plurality of machine learning models to generate a moderation result indicating whether the media post contains offensive content.

Optional features of the system of the first aspect may be combined with the method of the second aspect in any combination.

The disclosure extends to a computer-readable medium comprising instructions which, when executed by a computer, cause the computer to carry out any of the methods disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

In overview, examples of the disclosure provide systems and methods for automatically moderating content generated online. The content may be from a social media platform (e.g. Twitter, Facebook, Instagram etc.), or any other suitable online platform including online gaming platforms, dating platforms, sporting platforms, business platforms and so on.

In some examples, the system comprises two main components: an AI moderation component and a content analysis component. The AI moderation component receives and processes input data corresponding to social media content items (e.g. social media posts or messages), and determines whether they are offensive or not. The content analysis component acts as an interface between the media platform and the AI moderation component. This may involve obtaining the content items via a suitable API, pre-processing the content items, transmitting them to the moderation component and receiving a result. The content analysis component may also interact with the social media platform to take some relevant action (e.g. hide or delete a post) based on the moderation result. Accordingly, the content analysis component acts as a wrapper that encapsulates the interaction with social media platforms.

In other examples, external systems can interact directly with the AI moderation component without interfacing with the content analysis component. This allows the AI moderation component to provide moderation results to diverse third-party platforms or systems. For example, company-internal communication systems, gaming platforms or third-party applications having chat or messaging functionality may leverage the AI moderation component.

Figure 1:
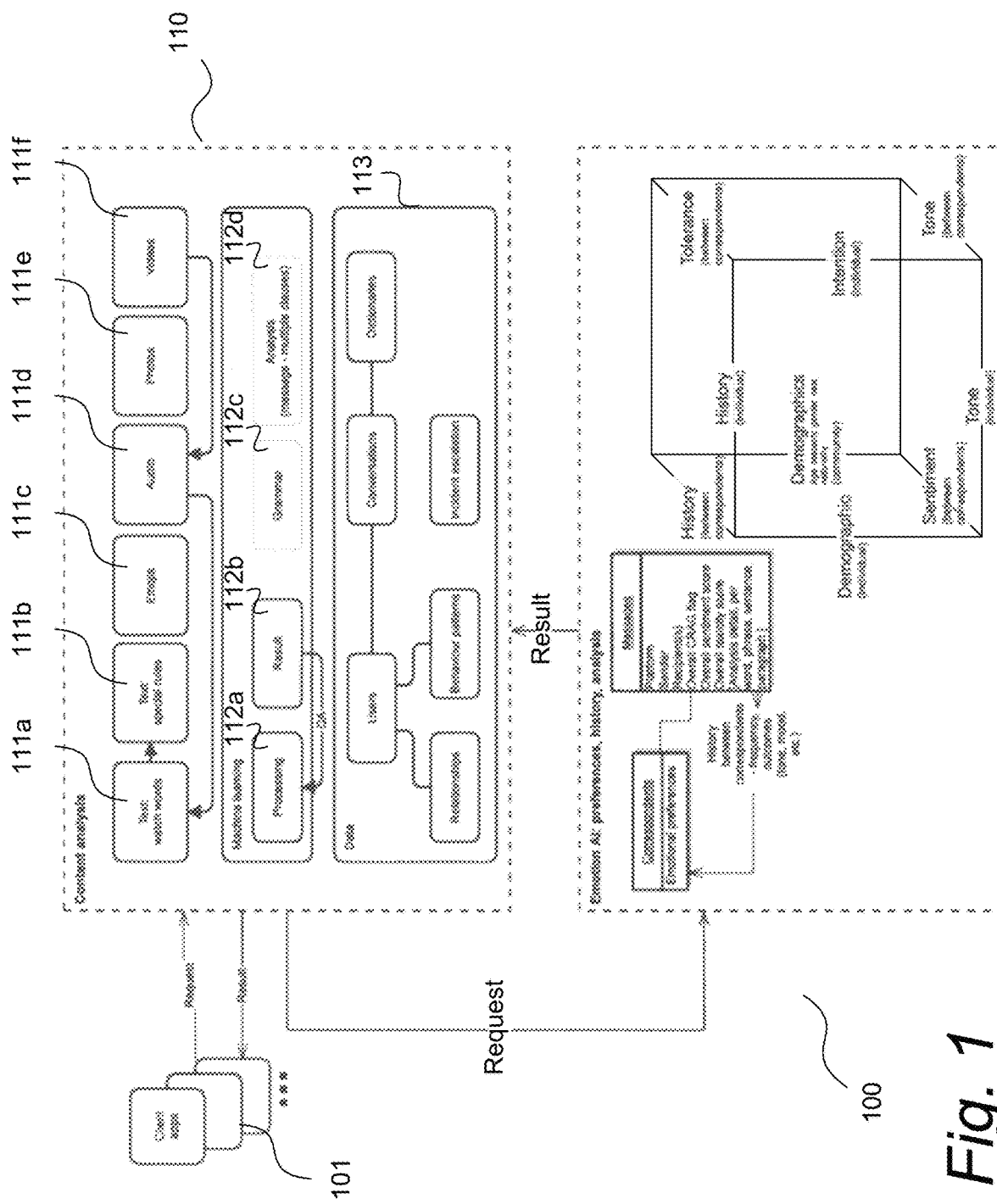
FIG. 1 shows a schematic block diagram of an example system

FIG. 1 shows an example content moderation system 100. The system comprises a content analysis module/component 110 and the AI content moderation module/component 120.

The content analysis module 110, which may also be referred to herein as the wrapper component, interacts with client applications 101. These may be particular social media platforms, such as Facebook, Twitter, Instagram or the like. In other examples, they may be gaming, dating platforms, online forums or any other sort of platform in which online messages and posts are made.

The client applications 101 may be accessible via a suitable API. That is to say, each platform may offer an API that allows programmatic access to posts and/or messages made on the platform. Discussion herein of the content analysis module 110 "receiving" the messages includes examples in which the module 110 actively requests the messages.

Upon receipt of a request to moderate a message from the client application, the content analysis module 110 is configured to carry out any suitable pre-processing. For example, the content analysis module 110 may do one or more of the following: tokenise, parse or chunk the text, may identify non-textual content (e.g. audio/video/images), convert audio content (including that present in videos) to text, convert video content to still images (e.g. by sampling the video at regular intervals) and so on.

The content analysis module 110 may also apply some initial analysis techniques, including applying predetermined rules to tag specific offensive words or phrases. This is generally indicated by the blocks 111a-f. The blocks 112a-d illustrate that, in some examples, the content analysis module 110 may carry out further processing steps to perform machine-learning based grammar analysis or other pre-processing steps. Block 113 represents that the content analysis module may store data associated with a user. In this context, the user may be the account holder of a social media account on the relevant platform. This may include details of relationships or behaviours of the user, records of conversations of the users, or dictionaries associated with the user.

Once the pre-processing has been carried out, the pre-processed data is provided as input data to the AI content moderation module. The role of the AI content moderation module is to determine whether the input data corresponds to a message that is offensive. By offensive, it is meant that the message fails whatever the intended moderation criteria is. As discussed below, "offensive" will be different in different platforms and different contexts.

The AI content moderation module 120 comprises a plurality of trained machine learning models. Each model is configured to process the input data and provide an output. Each model is configured to assess or analyse the input data in a different manner.

For example, one model may be a sentiment analysis model to output a sentiment value based on the input data. This may give a score that indicates whether the message carries a positive or negative sentiment. It may also give an indication of the object of the sentiment. Other possible models include:
- a key word identification model to detect offensive words;
- an image processing model to detect offensive images;
- a contextual key word model configured to detect offensive words based on surrounding context, as opposed to merely individual offensive words;
- an intention detection model to detect an author of the post's intent;
- a fuzzy logic model configured to detect offensive words that have been modified to avoid detection;
- an emoji processing model configured to detect the offensive use of emojis; and
- a toxicity model to detect toxicity and provide a toxicity score indicative of the use of toxic speech.

The contextual key word model may be referred to as a detector of escalating/deescalating language, in the sense that the contextual cues may make clear that an otherwise offensive word is not being used in an offensive manner, or that an otherwise benign word is being used offensively.

The models may be trained on historic media posts. Such posts are typically labelled by existing moderation systems, and thus there are large quantities of training data available for training the models.

The AI content moderation module 120 may then combine the output of the various models to arrive at a moderation result. For example, a plurality of rules or heuristics may be provided to combine the output of the models. Some of the models may output a numerical score (e.g. a sentiment score or a confidence score associated with a prediction made), where the rules comprise a threshold applied to the model output. By way of illustration only, if several of the models make a prediction indicative of offensive content with high confidence, the moderation result may be that the content is offensive. If only one model makes such a prediction with low confidence, the content may be deemed inoffensive. Block 121 illustrates the potential combination of some of the model outputs.

In other examples, machine learning could be applied to combine the outputs (e.g. an ensemble learning approach), or the outputs could be averaged (e.g. a weighted average).

The AI content moderation module can be considered an emotional AI tool, in the sense that it assesses the input data to detect sentiment and other axes which correspond to the emotional content of the message, rather than merely detecting key words.

The moderation result that is the result of combining the output of the models is then returned to the content analysis module. The content analysis module in turn is then able to interact with the client application based on the moderation result. For example, if the moderation result indicates that the message has passed moderation and is acceptable, the content analysis module may in turn interact with the client application to approve the message. Conversely, if the moderation result indicates that the message is unacceptable, the content analysis module may interact with the client application to delete, hide or prevent posting/sending of the message, report the content, as appropriate.

In some examples, the moderation result may not be a binary value (i.e. approved/not approved). For example, the moderation result may be approved/not approved/requires human assessment, or may be a suitable output score to which thresholds may be applied or the like.

Figure 2:
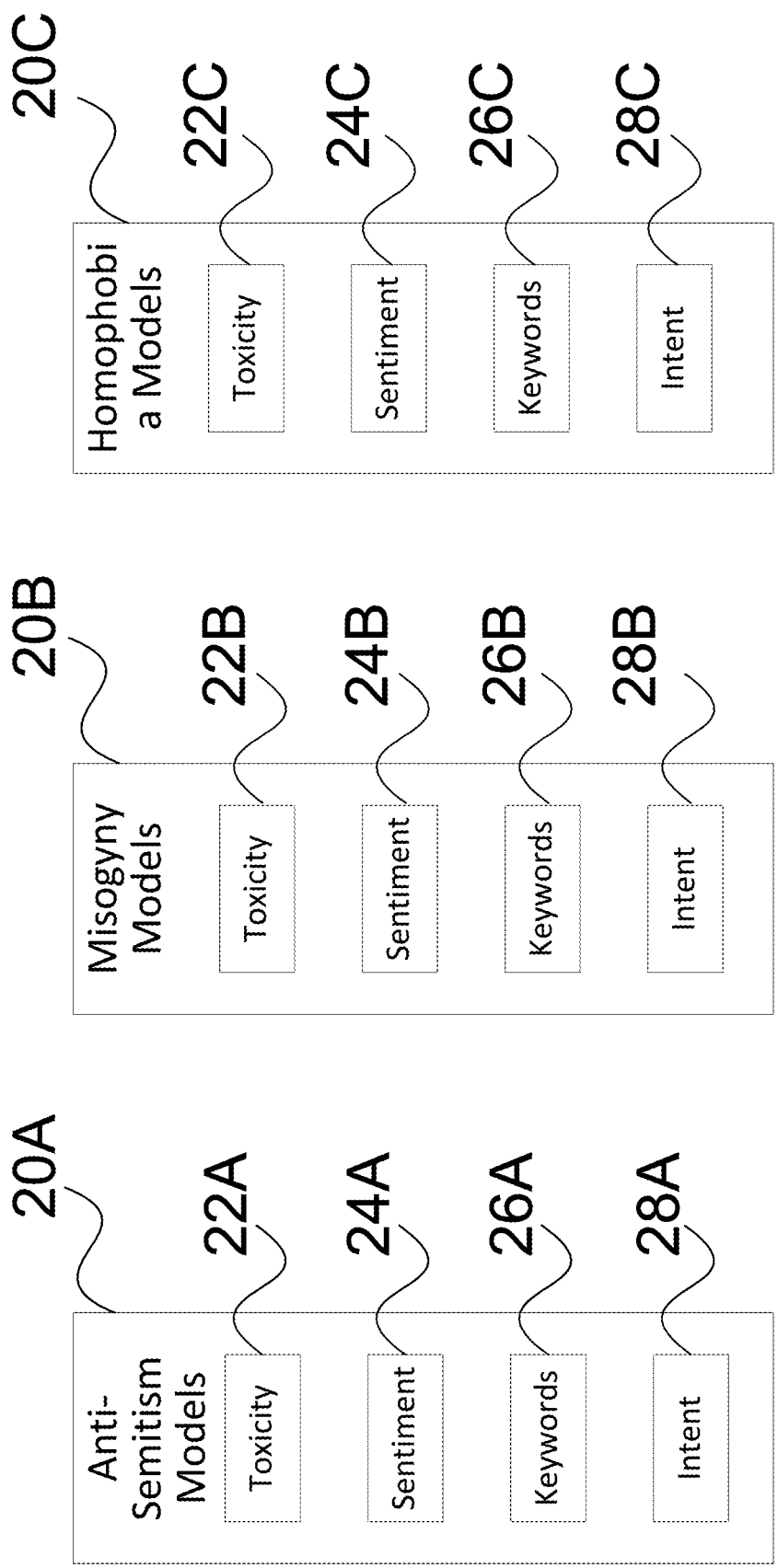
FIG. 2 is a schematic diagram of an example set of models

Turning now to FIG. 2, an example of the models used by the AI content moderation module are illustrated. In FIG. 2 it is shown that the content moderation module may comprise a plurality of sets of models, e.g., 20A, 20B, and 20C, wherein each set of models 20 is configured to identify a particular type of offensive material. For example, one set of modules 20A may relate to antisemitism, another 20B to misogyny, another 20C to homophobia and so on. The models 22A-C, 24A-C, 26A-C and 28A-C in each set may be trained on that particular type of content. This may involve providing a separate training set for each type of content and retraining the model, or may involve fine-tuning a general model on a particular type of content. This allows for the modular selection of particular types of content moderation.

Figure 3:
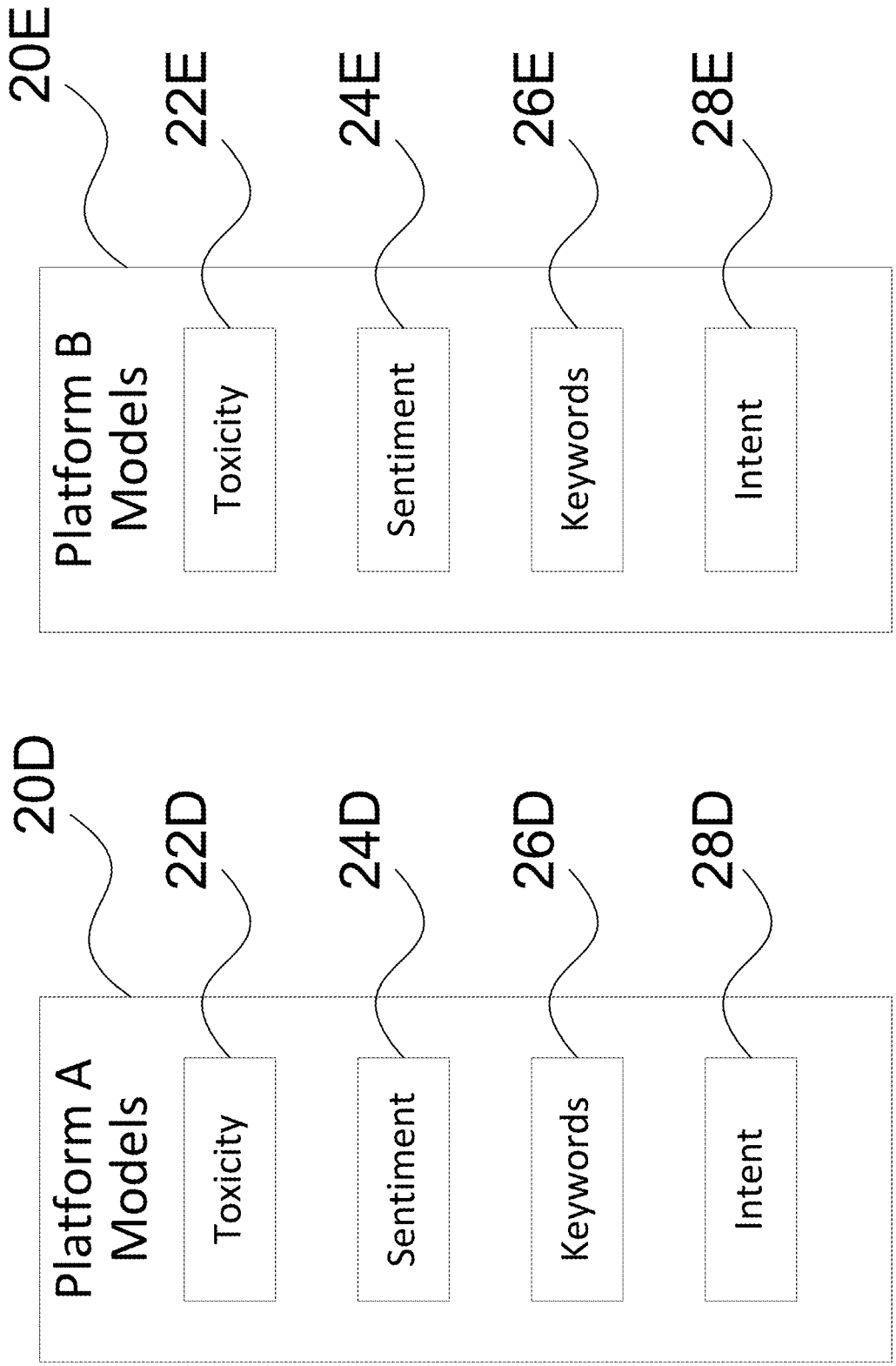
FIG. 3 is a schematic diagram of an example set of models

FIG. 3 similarly illustrates a plurality of platform specific models, 20D and 20E, each plurality 20D, 20E including respective models 22D-E, 24D-E, 26D-E, 28D-E. These may be trained on a particular platform, or trained on data to a specific type of content appearing on a platform. For example, a trained model may be configured for football related discussions, for example on a sports or esports streaming platform. Another may be trained to process messages sent to CEOs or other executives on a professional platform such as LinkedIn. By providing context-sensitive models, customized and more accurate moderation may be provided.

It will be understood that the concepts in FIGS. 2 and 3 may be combined. For example, platform specific models for a particular type of offensive material may be provided. In some examples, AI models may not be trained to assess particular types of offensive language or trained on particular platforms. In such embodiments, each AI model (e.g., sentiment, toxicity, intent, keywords etc.) may be applied to the input content independently of the context, and the subsequent combination of AI outputs may be weighted or otherwise adjusted based on the context, as discussed in more detail below with reference to FIG. 5.

Figure 4:
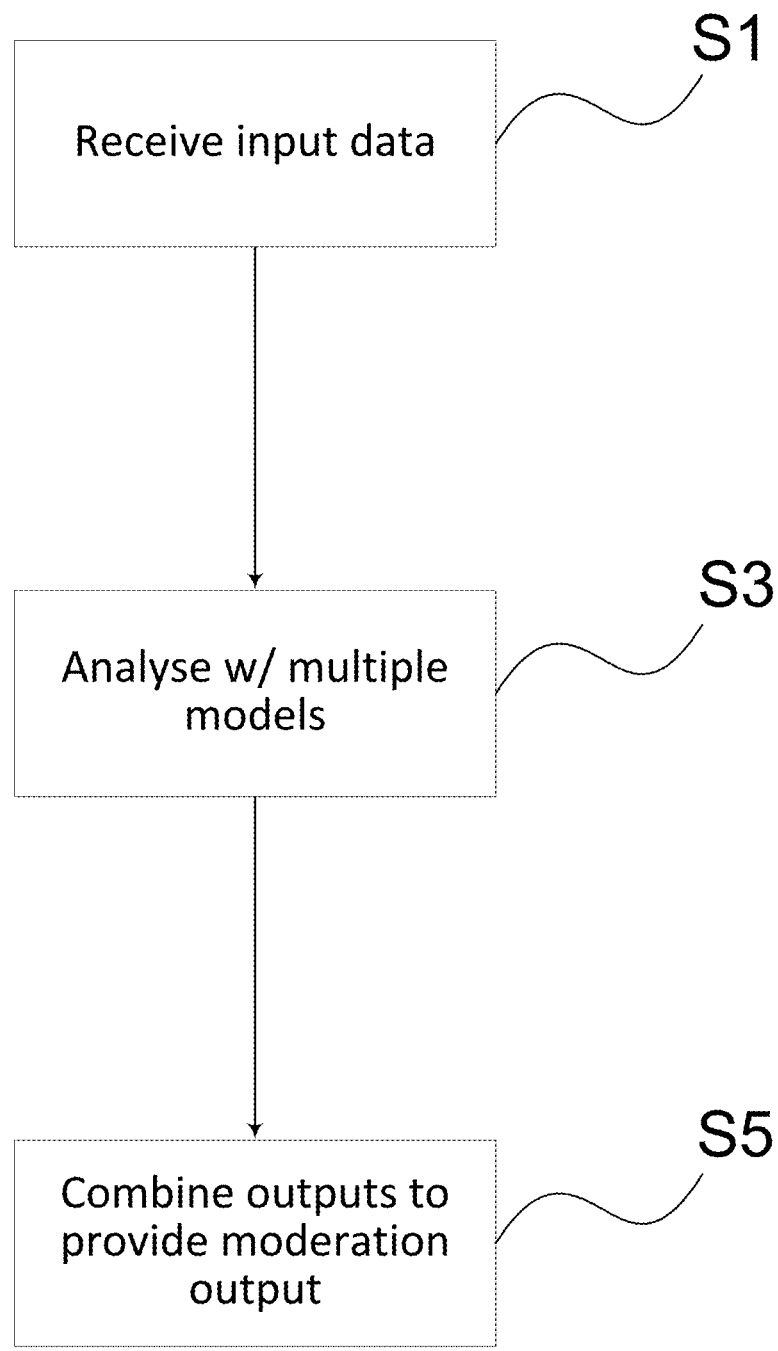
FIG. 4 is a schematic flowchart

FIG. 4 is a schematic flowchart illustrating an example method. The method includes receiving input data corresponding to a social media message or post at a step S1. The method includes analysing the input data at a step S3, using a plurality of machine learning models. The method includes combining the outputs of the models to provide a moderation output at a step S5.

Figure 7:
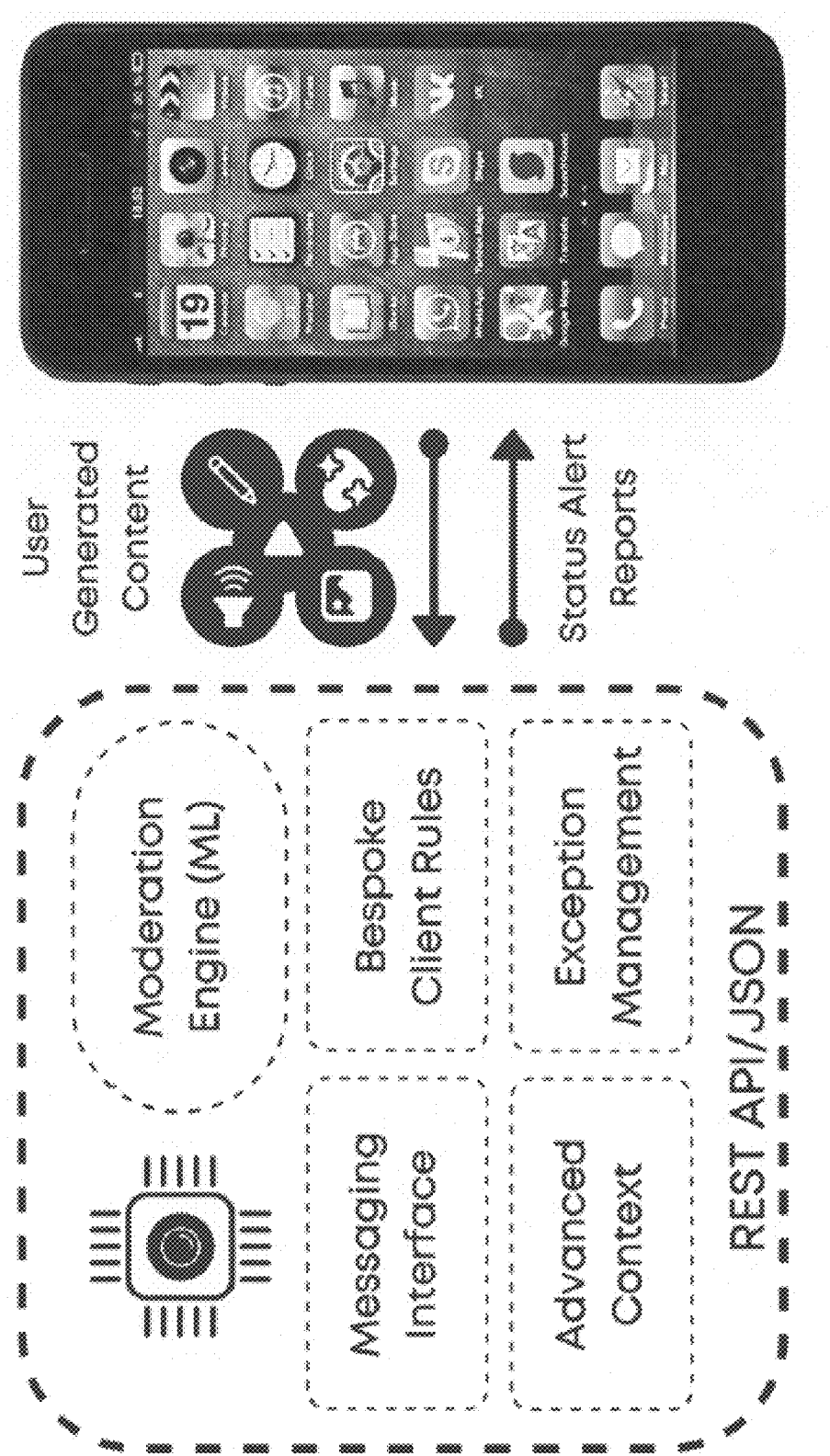
FIG. 7 is a block diagram of an example system

FIG. 7 illustrates the application of the techniques herein to a mobile application setting. Rather than client apps, software running on a user device or other device can communicate with the systems described herein, to moderate content as it is generated on the device. This may for example be useful for moderation software for monitoring children's usage of social media.

Further description of optional features of the examples of the disclosure is set out below.

The content moderation system comprises a front end which receives content, APIs that allow communication with the moderation system, and a back end that performs moderation analysis.

The system assesses the suitability of content for viewing by a user, for the purpose of moderating or restricting the viewing of content which is not suitable. The content may be images, text, audio, video or a combination thereof. The moderation system may be used in the context of moderating content on social media.

A cloud service may be used to host the content moderation system.

The moderation system uses AI and Machine Learning techniques to produce a score, to which thresholds may be applied to determine an action to take. E.g.: green, amber, red for decreasing levels of acceptable content.

The level of suitability is assessed in context, where the context is multi-faceted. The same content may have a different level of acceptability in a different context. A different AI model may be applied for different contexts.

The 'context' of the content may be a combination of: the social media site hosting the content, the general preferences of users on that site, the themes of the content, overall semantic meaning and sentiment of the content, history of interaction between users and the themes of the content and the intention of the author in submitting the content. The context may take into account any aspect of the social media platform, its audience, themes and semantics of the content, and the preferences of individual users or groups of users.

The content moderation system learns, from training data, how context affects the acceptability of content.

Identifying the true intention and sentiment of a piece of content goes much deeper than identifying key or triggering words and associating them with a theme. For example, a piece of positive content promoting gay rights may include a strongly worded dismissal of opposing, homophobic views. However, a simple keyword identification of strong, negative language coupled with identified themes of homophobia may overlook that the piece of content as a whole has a positive underlying message and would not offend audiences who, for example, are otherwise sensitive to homophobic content.

Content posted to a social media site such as Twitter, including explicit language as part of a discussion of a football match, may be totally acceptable in view of the tolerance of football fans for explicit language, in view of the positive, or at least benign, sentiment of the content, and in view of the tolerance levels of Twitter itself for explicit language/content. However, even language (or other content) directed at another user may be interpreted as 'banter' or harmless competitive spirit in a sporting context, for example. The same content may, however, be totally unacceptable in another context, such as on a career-focused platform such as LinkedIn, or in a context with no history of strong but playful language, for example.

The system is also able to identify instances in content where a word, sentiment or underlying theme has been concealed by the author. For example, words that include special characters or numbers in place of letters may be interpretable by human users, but may be overlooked by trigger word detection models.

An override component may exist, which allows human users to assess content and decide what action to take. An action taken in response to a content flag that required human intervention may be automatically submitted as training data to the moderation system. This is useful because the way that content is perceived by human users is dynamic; that is, the suitability (acceptability) and appropriateness of particular words or themes may change over time.

A distinction is made between content detection and content moderation. Content detection involves the identification of content that potentially crosses a notional suitability threshold. Content moderation involves taking an appropriate technical action (e.g., block, mute, report) after performing the content detection step. Content moderation is more difficult to implement and, in particular, more difficult to automate.

The system performs content detection and content moderation with a high level of autonomy relative to competitor systems. The detection and moderation steps are highly bespoke to the context of the content.

A hierarchy of content analysis may be carried out. The main "cube" (122, see FIG. 1) is made up of many sub-cubes, each sub-cube having multiple edges. The main cube acts as an overall moderation system, as applied to a content item. Each sub-cube represents a theme or concept, such as 'racism', 'homophobia', 'misogyny' etc. Each sub-cube has a plurality of edges, where the edges are analogous to the separate analyses performed on the content item.

Exemplary analysis models include, amongst others: a keyword analysis, a content analysis, and an analysis of toxicity of sentiment. Each concept (sub-cube) may include the same set of analysis models (same edges), but analysis of the same type may differ between concepts (sub-cubes). For example, keyword analysis performed in respect of a 'racism' theme/concept may look for different terminology, compared to the keyword analysis performed in respect of a 'homophobia' theme.

The output of the edges of a particular concept are aggregated with an ensemble model to generate a score for the concept. A score is calculated for each concept. The scores generated for each concept may be combined to generate an overall score, where the weights and biases of each concept in generating an overall score depends on the moderation system's understanding of tolerance and other contextual parameters, where the moderation system's understanding of context comes from training data.

Video content may be separated into audio and video. Audio is processed for speech recognition and a series of frames, for example at an interval of $3s$, are extracted from the video and processed using image processing models.

The inventors note that the content moderation system is not designed to censor opinions and views, but rather to restrict what users see or hear, based on what they would want to see or be comfortable seeing.

Instances of emojis in content items may be analysed. The system may understand the underlying semantic meaning behind the use of a particular emoji, beyond the meaning inferred from the character itself. That is, a particular emoji may be widely recognised as having an implication or meaning beyond the scope of what it was designed to depict and represent.

Figure 5:
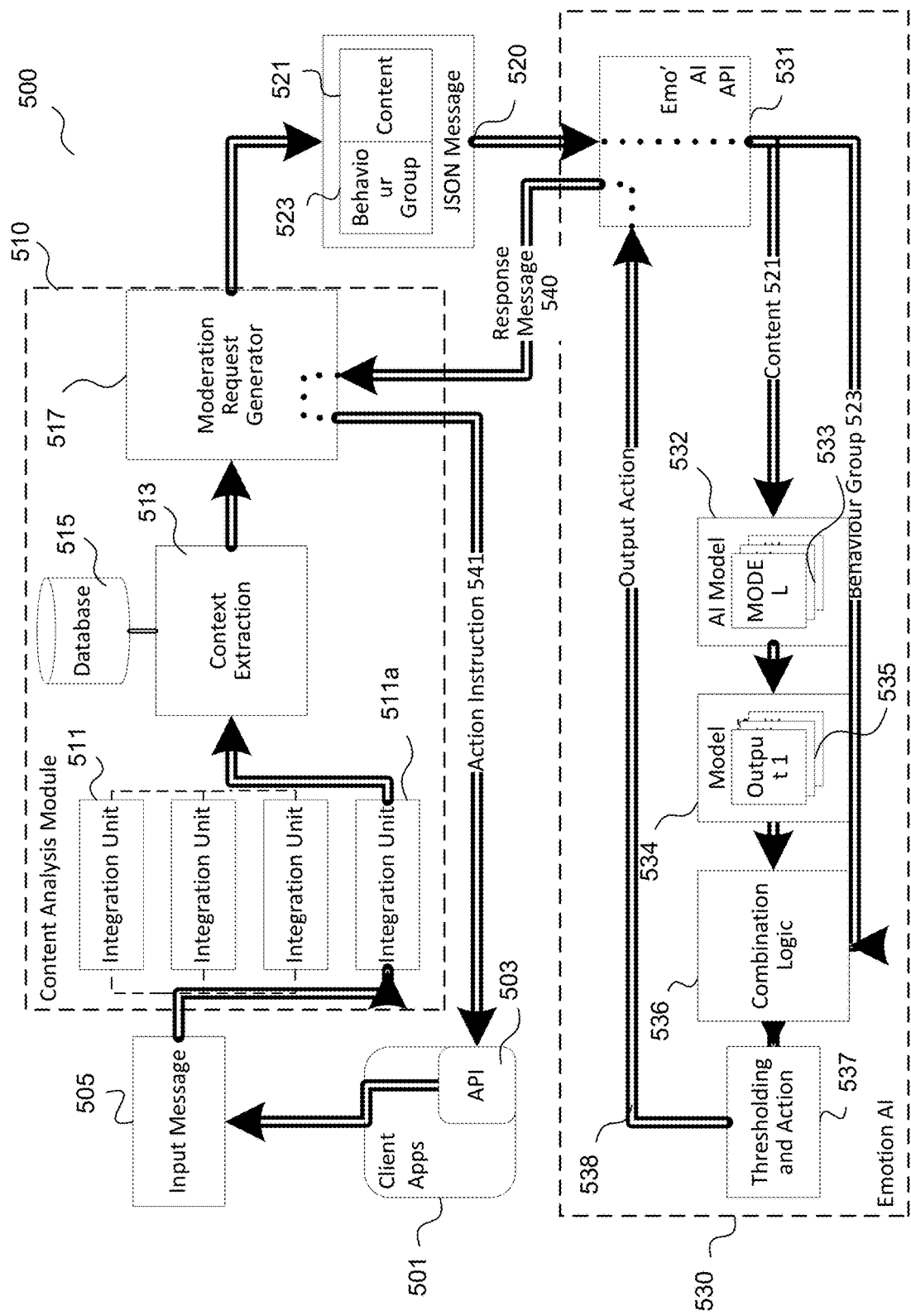
FIG. 5 is a schematic block diagram of an exemplary content moderation system

FIG. 5 illustrates another example computer system 500 for content moderation. The system 500 is similar in structure to the system 100 discussed above and shown in FIG. 1, and the features of systems 100 and 500 may be combined in any combination. In some respects, the exemplary system 500 of FIG. 5 represents a more detailed version of the system 100.

The system 500 includes a content analysis module 510, which may also be referred to as a client application handling module 510 herein. The module 510 corresponds generally in function to the module 110 discussed above. The system also includes a machine learning content moderation module 530, which corresponds generally in function to the module 120 discussed above.

FIG. 5 also shows one or more client applications 501, which again take the form of online platforms, such as social media platforms. The client applications 501 thus correspond to the client applications 101 discussed above. The system 500 communicates with the client applications 501 over a suitable network, such as the internet.

The API 503 is a programmatic interface offered by the client application 501, via which the account of a particular user may be managed. This may include accessing messages sent or received by the user, and accessing messages otherwise visible to the user accessing the client application, such as comments on videos, photos or other media, messages visible on the timeline and so on. By managing the user's account via the API 503, offensive content may be hidden, deleted or otherwise managed so that the user accessing the client application via another channel (e.g. on an application installed on a mobile device or via a web browser) is not exposed to the offensive content.

The API 503 is an application-specific API, specific to the particular client application 501. For example, the API 503 may be the Twitter API if the client application 501 is Twitter, the Facebook API if the client application 501 is Facebook, and so on.

The content analysis module 510 may comprise a plurality of integration units 511, each integration unit 511 representing an interface between the API 503 offered by a specific platform 501 and the module 510. The integration unit 511 may effectively translate structured content received according to a format set by the API 503 creator, into a standardised format for internal processing by the module 510.

It will be appreciated that the communication format employed by the APIs 503/integration units 511 may vary. In one example, the API receives requests and returns data encoded in JavaScript Object Notation (JSON), but other formats may be employed.

FIG. 5 illustrates an input message 505 received by a first integration unit 511a of a content analysis module 510 from the API 503. The input message 505 includes a content item shared to the online platform, which is an example of input data representative of a media post or message made on the online platform. The message 505 may be received as a result of the content analysis module 510 accessing the API 503 to retrieve newly posted content items or content items that are newly visible to the account holder. This may for example occur on a regular basis (i.e. periodically). Receipt of the input message 505 to the first integration unit 511a is represented by a double struck line. The input message 505 may further comprise contextual data, including one or more of the type of post or message, the user of the account (i.e. the account holder), the user making the post, a timestamp associated with the post and any other pertinent information relating to the content item.

The receiving integration unit 511a may then perform pre-processing operations on data received via the input message, for example to extract the content item from the input message 505 or to format the data for further analysis.

The content analysis module 510 includes a data store (e.g. a database), which stores an association between a user (i.e. the account holder) and one of a plurality of behaviour profiles. Each behaviour profile represents a set of viewing preferences or tolerances of users associated with the behaviour profile, which may be taken into account by the machine learning content moderation module 530 as discussed in more detail below.

For example, one behaviour profile may be associated with users that are sports people, or users interested in a particular sport. The online culture associated with particular sports (e.g. football) may be such that particular types of language (e.g. swear words) are relatively commonplace and users engaged with such content are unlikely to be offended by that language. Another behaviour profile may represent corporate users, operating in an environment or culture where there is a low tolerance for offensive content. Yet another behaviour profile may indicate a gaming user, who may again have a different set of expectations in relation to the level of desirable content moderation, and different tolerances in terms of exposure to potentially offensive content. It will be understood that a wide variety of profiles may be defined, so as to provide different tolerance levels for different users. In some examples, a profile may be associated with only a single user, providing a bespoke level of tolerance for that user.

Upon receiving content of the input message 505, the module 510 (represented in FIG. 5 by behaviour group retriever 513) may retrieve the behaviour profile associated with the user (i.e. account holder) from the database 515.

The content analysis module 510 further includes a moderation request generator 517, which generates a moderation request to be supplied to the machine learning content moderation module 530. The moderation request 520 includes the content item 521 to be moderated and the retrieved behaviour group 523.

The moderation request 520 may take the form of a call to an API 531 exposed by the machine learning content moderation module 530. For example, the API call or request may be in JSON format.

Turning to the machine learning content module 530, the module 530 forms a processing pipeline for moderating content 521, in view of the assigned behaviour group 523.

The machine learning content module 530 comprises the API 531. The API 531 acts as an interface between the content analysis module 510 and the machine learning content module 530. As discussed in more detail below, the API 531 may also be configured to receive requests from systems other than the content analysis module 510.

In one example, the API 531 is a stateless API. That is to say that the machine learning content module 530 receives moderation requests 520 via the API 531 and responds to the requests 520, but does not store any client session data or other data about previous requests 520 made by the content analysis module 510. This may be possible because the content analysis module 510 is managing the interaction with the client applications 501 and maintaining state.

A first module in the processing pipeline of the emotion AI module 530 is an AI model set 532, at which the content 521 may be received. The AI model set 532 comprises one or more AI model 533, each model 533 trained to assess a particular aspect of the received content 521, in a similar manner to as discussed above with respect to FIG. 1.

In one example, each AI model 533 is not supplied with the behaviour group 523 associated with the received content 521. That is to say that the AI models 533 receive the content 521 as input, but not the behaviour group.

Reference numeral 534 denotes a data store, to which respective outputs 535 of each AI model 533 may be temporarily stored. The outputs 535 of each AI model 533 may then be called by a combination module 536, which may use any suitable combination logic to output a combined value representative of the level of offensiveness of the received content 521.

In some examples, the output of a particular AI model may indicate a category and a probability. That is, a particular AI model configured to assess input data in a particular manner may provide an output which indicates a categorisation of the input data into one of two or more distinct classes. In such an example, the output probability may indicate a confidence of the AI model in assigning the input data to a particular one of the two or more distinct classes, or a probability associated with the each of the classes, such that the class of highest probability is the assigned class. In the above example of a sentiment AI model, 'positive' and 'negative' sentiment may be respectively represented by a distinct class, into which the input data may be classified; the sentiment model may further output a probability representing the confidence level with which the sentiment model has classified the input data into a particular class. In other examples, the output of an AI model may be a numerical value, which is effectively a measure of the amount or level of a particular phenomenon (e.g. toxicity) in the input data.

In some embodiments, one or more of the AI models 533 may be based on one or more generic language models. These may be pretrained on large volumes of general text data, and thus are suitable for a wide variety of language processing tasks. The AI model is then subsequently tailored to a particular task by further training (or fine-tuning), based on a tailored training set comprising application-specific training data. Examples of such generic language models (also referred to in the art as "large language models") include BERT, GPT-3, and cohere.

In one example, the plurality of AI models 533 includes a nudity detector, such as NudeNet (pypi.org/project/NudeNet/). The plurality of AI models 533 may include one or more machine translation models, configured to translate the content item. The translation models may be applied as a pre-processing step, with the output of the translation models forming input to the other models 533.

The combination logic applied to the outputs 535 may take the form of a series of predefined operations (e.g. rules or heuristics) applied to the output 535. The operations may include thresholds applied to particular model outputs, or mathematical operations (e.g. sums, weighted averages) are applied to combine the model outputs. The combination logic may also comprise the application of ensemble models to combine the outputs 535.

In one example, the combination module 536 may further receive an indication of the associated behaviour profile 523 as input, the indication of the behaviour profile 523 being received from the API 531. The method by which the combination logic 536 combines the model outputs 535 may be dependent on the behaviour profile 523. In other words, the combination module may apply a different combination logic (i.e. a different series of predetermined operations), depending on the received behaviour profile. For example, the module 530 may store combination logic associated with each behaviour profile, and retrieve and apply the logic. Therefore, an output value of the combination module 536 may also be dependent on the associated behaviour profile 523. That is, an identical set of model outputs 535 may result in a different combination output if a different behaviour profile 523 is assigned.

Accordingly, the same set of AI models 533 may be used to provide automatic moderation that is tailored to a particular type of account holder. For example, the aforementioned sports profile may involve a lower weighting of an AI model detecting swearing compared to a corporate profile.

The module 530 of FIG. 5 further includes a thresholding module 537. The thresholding module 537 may categorize the suitability of the content 521 for display in the associated context, based on the output value of the combination module 536. In other words, the thresholding module 537 generates a moderation result based on the output of the combination module 536.

For example, the content 521 may be deemed suitable for display (i.e. pass the moderation) if the combination output value is determined to be above a first exemplary threshold value stored in the thresholding module 537. By contrast, the content 521 may be deemed unsuitable for display to the user (i.e. fail the moderation) if the combination output value is determined to be below the first exemplary threshold value stored in the thresholding module 537.

It will be appreciated that the thresholding module 537 may perform any suitable thresholding method, and may comprise any number of predefined threshold values for sorting the content 521 into a respective number of predefined categories. Note that a 'category' in this sense may be defined by a first threshold value representing a lower bound, and/or a second threshold value representing an upper bound. That is, one or more category may be provided for one or more respective range of combination output values. For example, the moderation result may include a category that indicates the content item requires human moderation, as well as categories representing passing and failing the moderation.

Although in the above example, the output value is inversely proportional to the offensiveness of the content (i.e. higher values are more likely to be suitable content), it will be appreciated that in other examples the output value may be proportional to the offensiveness, and the thresholds adjusted accordingly.

When the thresholding module 537 generates a moderation result, the module 537 may communicate the moderation result to the API 531. This communicative step is represented by an arrow denoted 538 in the example of FIG. 5. On receipt of the communication 538 of the action, the API 531 may send a response message 540 to the moderation request generator 517, the message indicating the moderation result.

Upon receiving the response message 540, the moderation request generator may communicate with the application-specific API 503, sending an action instruction message 541, indicative of the action, to the relevant client application 501. The relevant client application 501 (online platform) may then put the action into effect. The moderation request generator 517 may send the action instruction 541 via the relevant integration unit 511a, which may format the action instruction message 541 for receipt by the API 503 at the client application 501.

For example, where the content item is a comment or post that would appear on the user's timeline, it may be hidden from view if the content item fails moderation. If the content item is a comment on or responsive to other content posted by the user (e.g. a comment on an Instagram or Facebook post or the like), the comment may be deleted if it fails moderation. In some examples, the action taken by the content analysis module 510 may include blocking, hiding or reporting content items originating from the author of the content item. It will be appreciated that the relevant APIs 503 and associated applications 501 may offer differing mechanisms for dealing with offensive content and authors of offensive content.

Where the content item passes moderation, it may be the case that the content item is explicitly approved or released so that it can be accessed by the user. In other examples, it may be that no further action is taken. That is to say, content items may be accessible by the user until they fail moderation, at which point action may be taken as set out above.

In examples where the moderation result is indicative of a content item requiring human review, the content item may be held until it has been reviewed by a moderator, for example via a suitable dashboard.

In some examples, the module 510 and module 530 are executed on different computers or computer systems. For example, each module 510, 530 may be hosted on different server computers or computing platforms. For example, the module 530 and/or module 510 may be executed in a cloud computing environment. This may enable autoscaling of resources. In other examples, the module 530 and 510 may be disposed on different or the same server computers.

As discussed above, in some examples the module 530 may be accessible by external platforms or computer systems, via the API 531. Accordingly, a third-party platform may be provided with moderation results. This configuration may be particularly useful for integration with existing systems and applications that include an ability to generate content items, but which do not have their own APIs similar to the APIs 503. This includes applications such as workplace or organisation internal communication systems, gaming systems or other applications that include live chat or messaging, and so on. It may also enable the configuration illustrated in FIG. 7, with software installed on a user device accessing the module 530 to moderate content on the user device.

Figure 6:
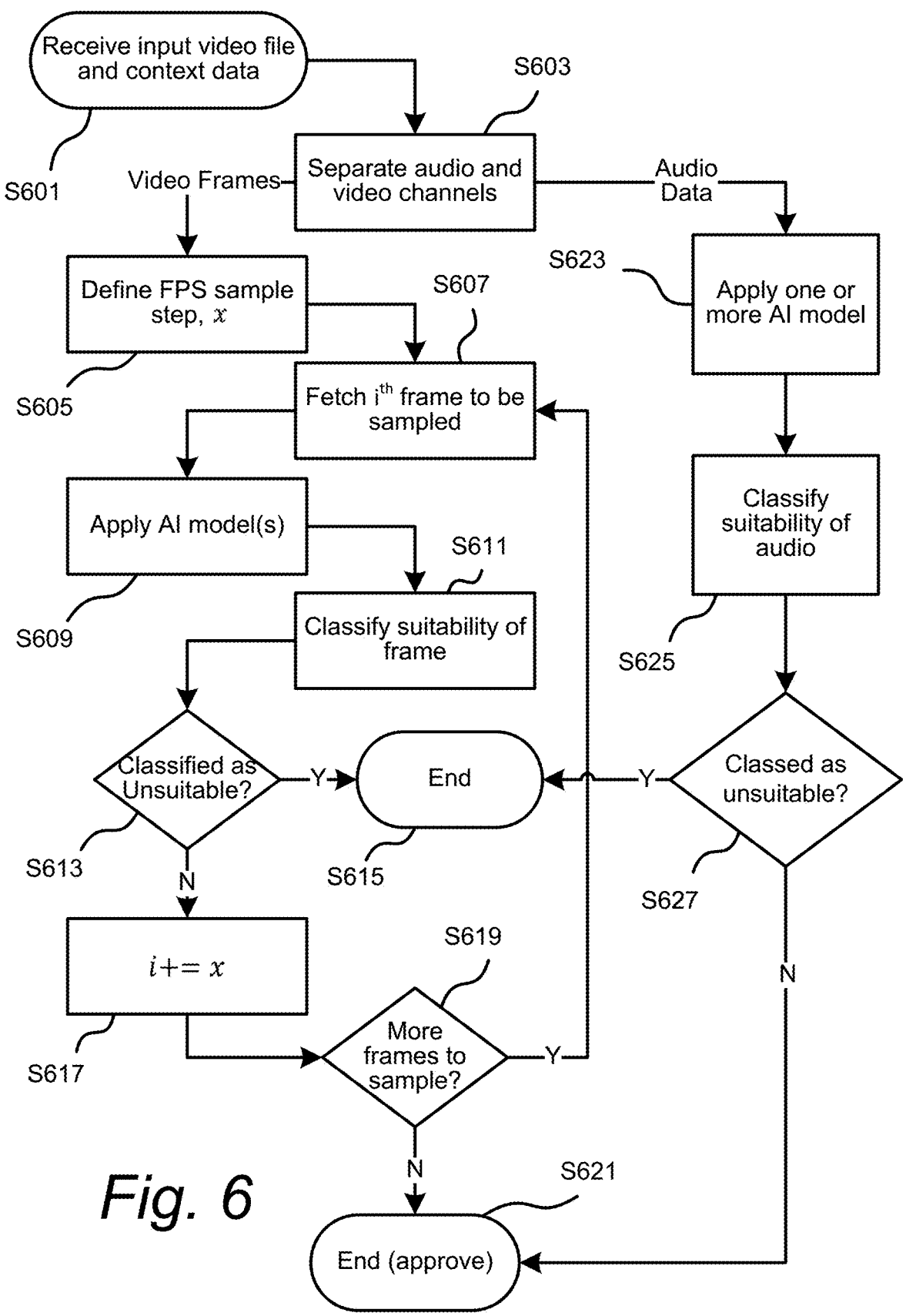
FIG. 6 is a flow diagram that represents an exemplary image processing pipeline of an example content moderation system

As discussed previously herein, the content moderation system 100, 500 may be applied to a video file to assess whether the video content should be displayed in a given context. FIG. 6 shows a flowchart that represents an exemplary image and audio processing pipeline for classifying video data as offensive or not offensive. It will be appreciated, however, that other techniques, methods or processing pipelines may be implemented to the same effect.

The flowchart of FIG. 6 begins at a step S601, wherein content comprising a video file is received. At a next step, S603, the audio and video channels of the video file may be separated by any suitable method. Audio and video data are processed via different pipelines. Step S603 may further include assigning an index value to each frame of the video data. Steps S605-S619 of FIG. 5 represent an exemplary video/image data processing method, and steps S633-S637 describe an exemplary audio processing method.

To process the frames of the video data, a frames per second (FPS) sampling step x is defined at step S605, such that only one in every x (e.g., 10) consecutive video frames may be sent through the image processing pipeline. Step S605 is taken because it may be an inefficient use of time and computing resources to send every frame of a video file through an image processing pipeline. Further, since the temporal separation between consecutive video frames is generally very short, relative to events occurring within the video, it is unlikely that an instance of inappropriate content would evade detection if a suitable FPS step is defined. Defining an FPS step therefore enables a balance to be struck between processing resources and likelihood of missing an instance of inappropriate content. FPS step may be predetermined, e.g., as an absolute value or as a fraction of an actual frame rate of the input video file. Alternatively, FPS step may be defined by user input, or in a suitable configuration file. Note that an FPS step of 1 may be implemented, such that all frames are processed.

At a step S607, an $i^{th}$ frame of the video content is fetched for input into the image processing flow. Note that on a first iteration of the flow, the $i^{th}$ frame is a first fetched frame of the video file. Note that i as used in this example is an arbitrary indexing variable used to iterate over frames of the video file.

Upon fetching a frame, one or more image processing AI model may be applied to the frame data at a step S609. The AI models applied may include a nudity detection model. The method may include extracting text from the image (e.g. using a suitable OCR model), and then applying one or more of the AI models discussed herein to the text extracted from the image.

In examples where more than one model is applied to a frame, the plurality of models may be applied in parallel to one another. Step S609 may be followed by a classification step S611, wherein the output of the one or more AI image processing model is used to generate a moderation result for the frame. The classification in step S611 may be applied by first combining outputs of the one or more AI models. As in other embodiments described herein, the AI model outputs may be combined using any suitable combination logic. Furthermore, the combination logic may be selected based on a behaviour profile of the user. The classification at step S611 may then classify the frame into one of two or more classes based on application of one or more respective threshold value to the output of the combination logic. In one example, three classes may be provided (e.g., passes moderation, fails moderation, inconclusive).

The flow then progresses to a step S613, wherein a determination is made as to whether the classification at step S611 indicates that the frame fails moderation. If the frame fails moderation, the flow progresses to a step S615, wherein the image processing method is interrupted, and the flow ends. That is, if a single static frame within the video file is classified as unsuitable, no further frames are fetched or processed. This reduces the burden on temporary memory, as data for only one video frame may be stored at any one time.

If, at step S613, it is determined that the frame is suitable for display, the flow progresses to a step S617. At step S617, the indexing parameter i may be incremented by a value x, where x is the FPS step. The flow then progresses to a step, S619, wherein it is determined whether any more frames are to be sampled. For example, S619 may include determining whether there exists a frame in the video with an index corresponding to the newly incremented i parameter. If it is determined that a next frame is to be processed, the flow returns to step S607 and fetches the next frame, corresponding to the incremented index parameter i. The newly retrieved frame may replace (i.e. overwrite) the previous frame, so that only one frame needs to be held in temporary storage at any one time. The portion of the flow between steps S607 and S619 may then repeat until the determination at step S619 returns that no more frames are to be sampled. Returning, as step S619, that no more frames are to be sampled infers that no content has been identified in the image frame data of the input video that fails moderation. In such a case, the flow progresses to a step S631, wherein the process ends. Ending the flow at step S631 may indicate that the content has passed moderation.

Steps S633-S637 represent an exemplary audio processing method. The audio processing method of steps S633-S637 may be performed before, after, or in parallel with the image processing steps S605-S619.

At step S633, one or more AI model may be applied to the audio data. In some examples, the audio data may be transcribed to text and the one or more AI models, may be applied to the transcribed text. At step S633, the audio data is moderated. For example, a combination of outputs of the one or more AI model may be performed and—as described in respect of step S611—one or more threshold may be applied to combined output of the AI models to categorize the suitability of the data. If, at step S637, it is determined that the audio has been classed as unsuitable, the flow progresses to step S615, wherein the flow ends.

It will be appreciated that in examples where audio data is processed first, the image processing steps may not be carried out if the audio is determined to be unsuitable because the process is terminated upon identification of unsuitable content. Similarly, the audio processing steps may not be carried out if the video data is assessed first and unsuitable content is identified therein. In examples where audio and video data are processed in parallel, progression to step S615 may result in termination of both the audio and video processing branches of the flow.

If, at step S637, it is determined that the audio data is suitable, the flow progresses to step S631, where the flow ends and at least the audio channel of the input video file is approved. It will be appreciated that the originally received input video file may only be approved for presentation if both the video and audio branches of the flow progress to step S631, without termination at step S615.

The process of FIG. 6 may be incorporated into the systems 100 or 500 discussed above.

Advantageously, the systems and methods discussed herein provide a flexible architecture for content moderation. The systems discussed herein advantageously make use of multiple AI models, which may be applied in parallel, rather than relying on a single monolithic AI model for content moderation. Furthermore, the behaviour profiles and combination logic allows the selection of AI models, as well as changes in the way their output is combined, depending on the desired end users and the level of moderation required.

Furthermore, the systems discussed herein lend themselves to flexible deployment. A stateless machine learning moderation component allows the module to be accessed by third party systems. The content analysis component is able to maintain state and handle interactions with a plurality of social media platforms. This may allow the system to provide content moderation for a single person or organisation across these multiple platforms.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A computer system comprising:
 a first computer configured to execute a machine learning content moderation component, configured to:
  receive input data representative of a media post or message made on an online platform;
  receive a behaviour profile selected from a plurality of behaviour profiles;
  analyse the input data using a plurality of machine learning models, the plurality of machine learning models including a key word identification model to detect offensive words and a toxicity model to detect toxicity;
  store a plurality of combination logics, each combination logic comprising a plurality of predefined rules for combining outputs of the plurality of machine learning models, a first rule of the plurality of rules comprising a threshold applied to a first output of the outputs, each combination logic corresponding to a respective one of the plurality of behaviour profiles;

select, based on the received behaviour profile, a corresponding combination logic of the plurality of combination logics, and combine outputs of the plurality of machine learning models using the selected combination logic to generate a moderation result indicating whether the media post or message contains offensive content, wherein the machine learning content moderation component comprises a stateless application programming interface (API) configured to receive the input data and provide the moderation result;

wherein the computer system further comprises a second computer configured to execute a content analysis component, the content analysis component configured to:

obtain a media post or message from an online platform using a client API provided by the online platform;

determine the behaviour profile that is associated with an account holder having an account on the online platform, wherein the media post or message is intended for display to the account holder, wherein each behaviour profile of the plurality of behaviour profiles represents a plurality of account holders having a same set of content viewing preferences;

transmit the input data and determined behaviour profile to the machine learning content moderation component on the first computer via the stateless API;

receive the moderation result from the machine learning content moderation component on the first computer; and in response to the moderation result indicating that the media post or message comprises offensive content, communicate with the online platform via the client API to delete or hide the media post or message, wherein the first computer is not configured to execute the content analysis component and the second computer is not configured to execute the machine learning content moderation component.

2. The system of claim 1, wherein the plurality of machine learning models comprises one or more of:

a sentiment analysis model to output a sentiment value based on the input data;

an image processing model to detect offensive images;

a contextual key word model configured to detect offensive words based on their context;

an intention detection model to detect an author of the input data's intent;

a fuzzy logic model configured to detect offensive words that have been modified to avoid detection;

an emoji processing model configured to detect the offensive use of emojis.

3. The system of claim 1, wherein the machine learning content moderation component is configured to moderate a video file comprised in the input data, wherein the machine learning content moderation component is configured to:

retrieve a first frame of the video file;

determine whether the first frame passes moderation;

in response to determining that the first frame passes moderation, retrieve a second frame and determine whether the second frame passes moderation; and in response to determining that the first frame fails moderation, determine that the video file fails moderation.

4. The system of claim 3, wherein the machine learning content moderation component is configured to determine whether the first and/or second frame passes moderation by applying the plurality of machine learning models and combining the outputs thereof to generate the moderation result.

5. The system of claim 3, wherein the machine learning content moderation component is configured to sample the video file to retrieve the first and second frames.

6. The system of claim 3, wherein the machine learning content moderation component is configured to determine that the video file passes moderation when all retrieved frames pass moderation.

7. The system of claim 1, wherein the machine learning content moderation component comprises a plurality of sets of models, each set of models comprising a plurality of models, wherein each set of models is trained to detect a different type of offensive content.

8. The system of claim 1, wherein the machine learning content moderation component is configured to analyse the input data using the plurality of machine learning models in parallel.

9. A computer-implemented method of moderation, comprising:

by a first computer:

receiving input data, via a stateless application programming interface (API), representative of a media post or message made on an online platform;

receiving, via the stateless API, a behaviour profile selected from a plurality of behaviour profiles;

analysing the input data using a plurality of machine learning models, the plurality of machine learning models including a key word identification model to detect offensive words and a toxicity model to detect toxicity;

storing a plurality of combination logics, each combination logic comprising a plurality of predefined rules for combining outputs of the plurality of machine learning models, a first rule of the plurality of rules comprising a threshold applied to a first output of the outputs, each combination logic corresponding to a respective one of the plurality of behaviour profiles;

selecting, based on the received behaviour profile, a corresponding combination logic of the plurality of combination logics; and combining outputs of the plurality of machine learning models using the selected combination logic to generate a moderation result indicating whether the media post contains offensive content, wherein the method further comprises, by a second computer:

obtaining a media post or message from an online platform using a client API provided by the online platform;

determining the behaviour profile that is associated with an account holder having an account on the online platform, wherein the media post or message is intended for display to the account holder, wherein each behaviour profile of the plurality of behaviour profiles represents a plurality of account holders having a same set of content viewing preferences;

transmitting the input data and determined behaviour profile to the first computer via the stateless API;

receiving the moderation result from the first computer via the stateless API; and in response to the moderation result indicating that the media post or message comprises offensive content, communicating with the online platform via the client API to delete or hide the media post or message.

10. A non-transitory computer-readable storage medium storing instructions which, when executed by a first computer, cause the first computer to:
  receive, via a stateless application programming interface (API), input data representative of a media post or message made on an online platform;
  receive, via the stateless API, a behaviour profile selected from a plurality of behaviour profiles;
  analyse the input data using a plurality of machine learning models, the plurality of machine learning models including a key word identification model to detect offensive words and a toxicity model to detect toxicity;
  store a plurality of combination logics, each combination logic comprising a plurality of predefined rules for combining outputs of the plurality of machine learning models, a first rule of the plurality of rules comprising a threshold applied to a first output of the outputs, each combination logic corresponding to a respective one of the plurality of behaviour profiles;
  select, based on the received behaviour profile, a corresponding combination logic of the plurality of combination logics; and
  combine outputs of the plurality of machine learning models using the selected combination logic to generate a moderation result indicating whether the media post contains offensive content,
wherein the non-transitory computer-readable storage medium stores further instructions which, when executed by a second computer, cause the second computer to:
  obtain a media post or message from an online platform using a client API provided by the online platform;
  determine the behaviour profile that is associated with an account holder having an account on the online platform, wherein the media post or message is intended for display to the account holder, wherein each behaviour profile of the plurality of behaviour profiles represents a plurality of account holders having a same set of content viewing preferences;
  transmit the input data and determined behaviour profile to the first computer via the stateless API;
  receive the moderation result from the first computer via the stateless API; and
  in response to the moderation result indicating that the media post or message comprises offensive content, communicate with the online platform via the client API to delete or hide the media post or message.

\* \* \* \* \*